Nov. 6, 1962 C. F. WYMAN 3,062,331

SHOCK ABSORBER

Filed Jan. 4, 1960

CHESTER F. WYMAN
INVENTOR.

BY John R. Faulkner
Clifford L. Sadler

ATTORNEYS

United States Patent Office 3,062,331
Patented Nov. 6, 1962

3,062,331
SHOCK ABSORBER
Chester F. Wyman, Brooklyn, Mich., assignor to Ford Motor Company, Dearborn, Mich., a corporation of Delaware
Filed Jan. 4, 1960, Ser. No. 224
3 Claims. (Cl. 188—88)

The present invention relates to shock absorbers for motor vehicles, and more particularly to direct acting hydraulic plunger type shock absorbers.

It has long been recognized that the conventional shock absorbers used in present day automobiles lack optimum control for all of the varying situations encountered in vehicle operation. For example, the shock absorber desired for a boulevard ride should be relatively soft in its dampening action. However, for use on gravel or rough roads where the frequency and amplitude of the wheels' oscillations are greater, the shock absorber should be stiff so as to restrict excessive wheel movement.

In view of the variety of operating conditions which an automobile may encounter, the vehicle engineers comprise in their design by providing shock absorbers which will operate reasonably satisfactorily under nearly all conditions. While a compromise provides an adequate shock absorber it is certainly susceptible to improvement.

Therefore, it is the principal object of the present invention to provide a shock absorber which will permit a soft ride where little wheel displacement is encountered but which will exhibit increasingly restrictive action upon extreme wheel jounce or rebound.

It is a further object of the present invention to provide a stroke sensitive shock absorber which is responsive in the amount of its dampening control to the amplitude of the shock absorber's deflection.

More specifically, the present invention provides a direct acitng hydraulic shock absorber of the piston type wherein the shock absorber's piston reciprocates in a pressure tube having a tapered configuration. Therefore, as the piston moves towards a narrow end of the tapered pressure tube, ever increasing restriction will encounter the piston as it passes through the hydraulic fluid within the tube.

Figure 1:
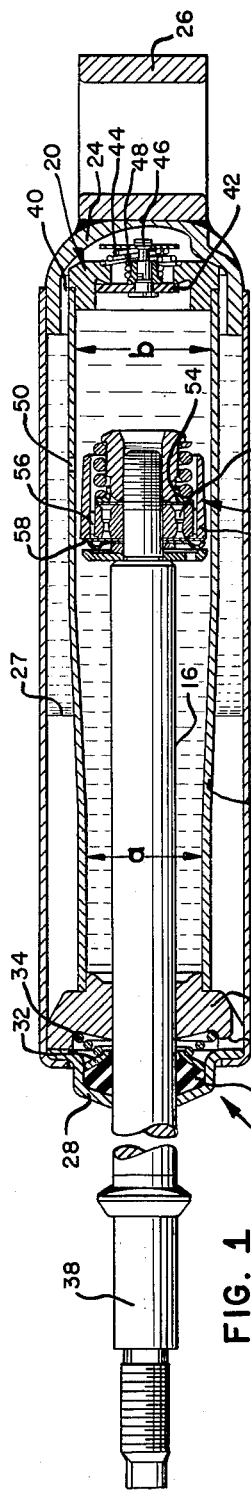

These and further objects of the present invention will become apparent from the following description and the accompanying drawing, wherein:

FIGURE 1 is a sectional view of a shock absorber constructed in accordance with the present invention.

Figure 2:
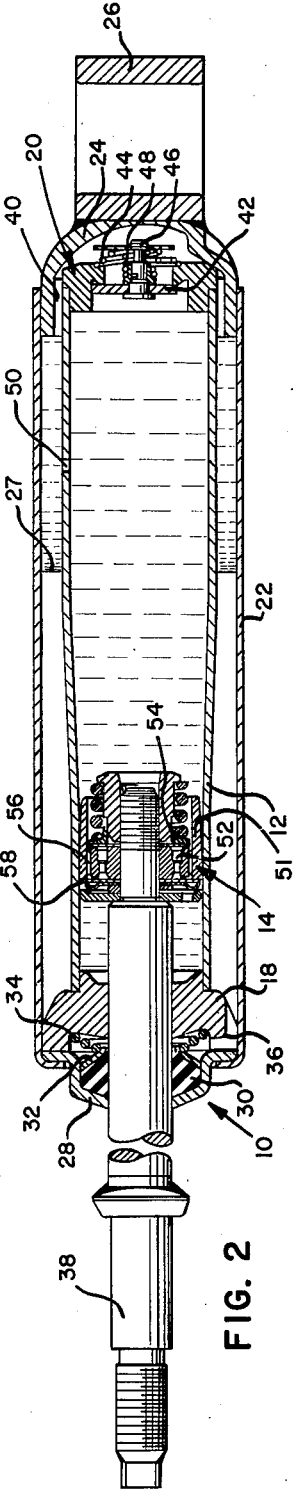
Figure 3:
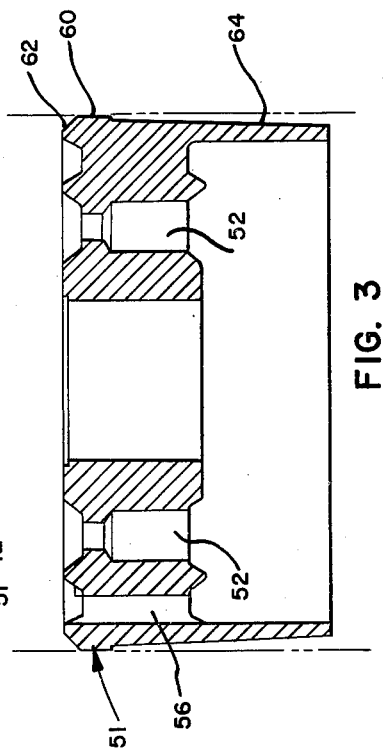

FIGURE 2 corresponds to FIGURE 1 showing the shock absorber in extreme rebound position, and FIGURE 3 is an enlarged sectional view of the tapered shock absorber piston which forms a part of the present invention.

Referring now to the drawing for a more detailed description, wherein like reference numerals identify like parts throughout the previous views, there is shown in FIGURE 1 a stroke sensitive shock absorber 10 having a tapered pressure tube 12. While pressure tube 12 will be described in greater detail later, it is noted here that in FIGURES 1 and 2 the amount of taper is shown exaggerated for purposes of clarity.

Reciprocately situated within the tube 12 is a piston assembly 14. A piston rod 16 is threadably connected to the piston assembly 14. The upper end of the tube 12 is sealed by a cylinder head 18, and the lower end of the tube is sealed by a valve assembly 20.

An outer tube 22 provides a fluid chamber of annular shape between it and the pressure tube 12 and contains the overflow and reservoir of hydraulic fluid. A cup shaped member 24 is welded to reservoir tube 22 as a closure for its lower end. A ring 26 is welded to the cup member 24 and serves as a connecting fixture so that that end of the shock absorber 10 may be secured to an unsprung component of the vehicle.

The upper end of the reservoir tube 22 is closed about a closure member 28. A rubber seal 30 is fitted about the piston rod 16 and is maintained in position by a washer 32 and a spring 34 which is disposed between the washer 32 and the cylinder head 18.

The entire pressure tube 12 is filled with a hydraulic fluid while the annular reservoir chamber is only about half filled as indicated by the fluid level line 27.

The piston rod 16 has a snug sliding fit with the cylinder head 18. However, if any fluid should leak past the cylinder head 18 into the area occupied by the spring 34, it would flow back to the annular reservoir contained by tube 22 through a notch 36 cast in the cylinder head 18. The upper end of the piston rod 16 is provided with a threaded portion 38 so that it may be secured to the body or other spring member of the vehicle with which the shock absorber 10 is associated.

The valve assembly 20 is of a conventional design and permits restricted flow of hydraulic fluid between the reservoir and the chamber below the piston assembly 14. Passageway 40 connects the reservoir with the exterior side of the valve assembly 20.

In the valve assembly 20 a spring pressed replenish valve 42 is closed by a spring 44 that controls the flow of fluid into the pressure tube 12 as the piston assembly 14 travels upwardly away from the valve 20 during a rebound stroke. Very little pressure is required to actuate or open the rebound replenish valve 42, and the fluid admitted to the pressure tube replaces that which was displaced by the piston rod 16.

During the jounce stroke a compression valve 46 of conventional configuration is controlled by a small stiff spring 48. Compression valve 46 constitutes one of the principal control orifices of the shock absorber 10 during the jounce stroke. Alternate or additional orifice control may be provided by holes such as 50 provided in the wall of the pressure tube. Valve 46 and holes 50 permit the expulsion of fluid from the pressure tube 12 to the reservoir when the piston assembly 14 is traveling to the right or bottoming. The flow of fluid corresponds to that displaced by the piston rod 16.

The piston assembly 14 is also of conventional arrangement except for the configuration of the piston 51 itself which will be described in detail shortly. During a rebound stroke when the piston is traveling to the left, fluid will pass through control orifices 52 which are closed by a spring pressed valve element 54. During a jounce stroke, fluid passes through the piston 51 by means of a plurality of holes 56 which are covered by spring pressed elements 58. The spring pressed element 58 controls the replenishing of hydraulic fluid to the area above the piston assembly 14. The holes 56 are not control orifices.

In the construction as so far described, the dampening action of the shock absorber as the piston moves either to the left in rebound, or to the right in jounce, is determined by the rebound orifices 52 and valve element 54 and the jounce control valve 46, respectively. Additional rebound control may be provided by orifice 50. The area below the piston is replenished with fluid through valve 42 and in jounce the area above the piston is replenished through valve 58.

As additional and varying control, the pressure tube 12 is provided with three longitudinal portions which consist of two end cylindrical portions of different diameters and an intermediate portion having a tapered configuration. The tube 12 is of a diameter as indicated by the letter "a" at its upper end and at the lower end it is of greater diameter as indicated by the letter "b." The central region of the tube 12 tapers from diameter "b" to diameter "a." The variations in diameters "a" and "b" are seen by comparing FIGURES 1 and 2 where no clearance is shown in FIGURE 1 between the tube 12 and the piston assembly 14 when the latter is positioned near the smaller end of the former. In FIGURE 2, where the piston is at the larger end, clearance is indicated.

As the piston assembly 14 reciprocates in its mid-region during mild wheel movement, fluid is permitted to pass between the piston and the pressure tube as well as through the valves within the piston assembly 14. During extreme wheel movement, when the piston is at the reduced diameter "a" portion of the tube 12, the clearance is substantially eliminated around the piston 51 and fluid flow must pass solely through internal valving of the assembly 14.

Thus, during the operation of the shock absorber 10 when the piston 51 is traveling in the mid-region of the pressure tube 12 less restriction is encountered and less dampening action occurs by reason of the fact that fluid is permitted to pass between the piston 51 and the tube 12 in addition to the valving of the piston assembly 14. This is in contrast to the situation where the piston 51 is traveling in extreme rebound position as seen in FIGURE 2. There the flow of fluid is restricted solely to the orifices in the piston assembly 14.

By way of illustration, in one particular embodiment of the present invention the diameter "a" was .990 inch and the diameter "b" was 1.001 inches. In that case the cylindrical portion of the tube having the diameter "b" was 2.5 inches long. The central tapered region was 3 inches long and the portion of the tube 12 having the diameter "a" was 1 inch long. While the difference in diameter between "a" and "b" was only .011 inch sufficient variation in control was achieved to meet the desired objectives. A stroke sensitive shock absorber having a single tapered pressure tube provides the greatest control for extreme rebound condition. However, if restrictive control is desired for both extreme jounce and rebound, then the pressure tube may be provided with a double taper. With this alternate arrangement, both extreme ends of the tube will be of reduced diameter and the central portion of the tube will have a somewhat larger diameter.

As an additional improvement, the present invention provides a tapered shock absorber piston 51 as best seen in FIGURE 3. Piston 51 has a circumferential land 60 positioned from the head of the piston by a camfered edge 62. The lower portion of the piston is provided with an extended tapered skirt 64.

Referring again to the operation of the piston 51 within the pressure tube 12. The tapered skirt 64 controls the centering of the piston 51 as it moves in the tube 12 and directs the flow of fluid around the exterior of the piston 51 as well as through it by a wedging type action.

As a specific example of a tapered piston which was employed in the shock absorber having the dimensions discussed above, the piston 51 had its greatest diameter at the land portion of .9990 inch. The skirt 64 had a maximum diameter of .995 inch directly beneath the land and tapered with an angle 0°45′ towards the axis of the piston. A number of successful skirt lengths were tested including one of approximately ½ inch.

Modifications of the present invention may occur to those skilled in the art which will come within the scope and spirit of the appended claims.

I claim:

1. A hydraulic shock absorber having a pressure tube and a piston reciprocably mounted within said pressure tube, valve means closing one end of said pressure tube, second valve means formed in said piston, said piston having a head portion and a skirt portion, the external surface of said skirt portion being tapered inwardly in a direction away from said head portion, said pressure tube being formed to have three longitudinal portions, said portions comprising an upper and a lower inner cylindrical portion of different diameters, and an intermediate tapered inner portion, said piston head portion having a snug sliding fit within the smaller of said cylindrical portions.

2. A hydraulic shock absorber having a pressure tube and a piston reciprocably mounted within said pressure tube, valve means closing one end of said pressure tube, second valve means formed in said piston, said piston having a head portion and a skirt portion, the external surface of said skirt portion being tapered inwardly in a direction away from said head portion, said pressure tube being formed to have three longitudinal portions, said portions comprising an upper and a lower inner cylindrical portion of different diameters, and an intermediate tapered inner portion, said piston head portion having a snug sliding fit within the smaller of said cylindrical portions, and the skirt portion of said piston being directed toward the larger of said cylindrical portions.

3. A hydraulic shock absorber having a pressure tube and a cup shaped piston reciprocably mounted within said pressure tube, said piston having a head portion and a circumferentially continuous skirt portion, said head portion being surrounded by a circumferential land, the external surface of said skirt portion being tapered inwardly in a direction away from said head portion, said pressure tube being formed to have a plurality of longitudinal portions of different diameters, said piston head portion having a snug sliding fit within the smallest of said longitudinal portions.

References Cited in the file of this patent

UNITED STATES PATENTS

| 333,568 | Stevens et al. | Jan. 5, 1886 |
| 1,137,123 | Fernanzo | Apr. 27, 1915 |
| 1,320,060 | Jenny | Oct. 28, 1919 |
| 1,655,786 | Guerritore | Jan. 10, 1928 |
| 1,660,744 | Davis | Feb. 28, 1928 |
| 1,845,167 | McGrew | Feb. 16, 1932 |
| 1,942,695 | Gross | Jan. 9, 1934 |
| 2,695,777 | Garrison et al. | Nov. 30, 1954 |
| 2,699,844 | McIntyre | Jan. 18, 1955 |
| 2,984,321 | Schutze | May 16, 1961 |

FOREIGN PATENTS

| 1,056,323 | France | Oct. 21, 1953 |
| 13,997 | Great Britain | June 15, 1912 |
| 16,632 | Great Britain | July 19, 1913 |